(12) United States Patent
Hu

(10) Patent No.: US 6,732,862 B1
(45) Date of Patent: May 11, 2004

(54) RETAINING STRUCTURE OF A DISC HOLDER

(76) Inventor: Wen-Long Hu, No. 22-2, Alley 51, Lane 195, Kuang Hsinig Rd., Pa Te City, Tao Yuan Hsien (TW)

( * ) Notice: Subject to any disclaimer, the term of this patent is extended or adjusted under 35 U.S.C. 154(b) by 0 days.

(21) Appl. No.: 10/300,771

(22) Filed: Nov. 21, 2002

(51) Int. Cl.[7] .............................................. B65D 85/57
(52) U.S. Cl. ................................... 206/310; 206/308.1
(58) Field of Search ........................... 206/307, 308.1, 206/310, 309, 493

(56) References Cited

U.S. PATENT DOCUMENTS

| | | | | |
|---|---|---|---|---|
| 6,311,835 B1 | * | 11/2001 | Okuhara et al. | 206/308.1 |
| 6,354,435 B1 | * | 3/2002 | Belden et al. | 206/310 |
| 6,364,108 B1 | * | 4/2002 | Bin | 206/310 |
| 6,398,022 B1 | * | 6/2002 | Mou et al. | 206/308.1 |
| 6,425,481 B1 | * | 7/2002 | Choi | 206/308.1 |
| 6,427,833 B1 | * | 8/2002 | Hui | 206/310 |
| 6,547,068 B2 | * | 4/2003 | Chu | 206/310 |

* cited by examiner

*Primary Examiner*—Luan K. Bui
(74) *Attorney, Agent, or Firm*—Browdy and Neimark, P.L.L.C.

(57) ABSTRACT

A retaining structure includes a holding portion, a retainer having a plurality of elastic pieces equally spaced on the holding portion, the elastic pieces each having a peripheral end being a free end, a pressing face positioned on a central portion thereof, and the pressing face connected to each of the elastic pieces through a connection part; a trench formed along an peripheral side of the pressing face, a plurality of wedges each formed on an external surface of each of the elastic pieces, and a plurality of arcuate wall each formed between two adjacent elastic pieces and separated from each of the elastic pieces by a slit communicated with the trench, and a recess formed on the base of the disk holder and opposite to the retainer.

2 Claims, 8 Drawing Sheets

RETAINING STRUCTURE OF A DISC HOLDER

BACKGROUND OF THE INVENTION

1. Field of the Invention

The present invention relates to a retaining structure of a disk holder. More specifically, the present invention relates to a retaining structure, which is used in a DVD/VCD/CD holder and is easily operated.

2. Description of the Related Art

Information recording medium such as DVD, VCD and CD need a holder to accommodate and protect them. A DVD/VCD/CD holder known in the prior art comprises a plurality of L-shaped retainers that are formed in a circle at a central portion of a base of the holder. The circle formed by the L-shaped retainers has a diameter larger than a central opening of the DVD/VCD/CD. When the DVD/VCD/CD is to be placed on the retainers, the central opening of the DVD/VCD/CD deforms the retainers until the retainers pass through the central opening of the DVD/VCD/CD. Thereby, the retainers apply a clamping force to the DVD/VCD/CD. When the DVD/CD/CD is to be removed from the holder, the retainers are pressed down to release the clamping force applied on the DVD/VCD/CD.

U.S. Pat. No. 6,283,286, issued to the applicant of the present application, discloses another DVD/VCD/CD holder. This known holder structure includes a cover and a base 10a pivotally connected with the cover, as shown in FIG. 1. A retaining device 11a is formed at a central portion of the base 10a for securely clamping the DVD/VCD/CD. The retaining device 11a includes a disk centrally protruding from a ace of the base 10a, a plurality of L-shaped retainers 12a, a plurality of equally spaed slits 13a each having the L-shaped retainer 12a formed there between, a plurality of arcuate portions 15a each communicating with each slit 13a, a pressing portion 14a formed at the center of the disk and connected with each of the L-shaped retainers 12a by means of a bridge 16a, and a plurality of arcuate walls 18a formed on the disk between two adjacent slits 13a. The arcuate walls 18a and the L-shaped retainers 12a, which together fit a central opening of the DVD/VCD/CD, define a pressing portion 14a therein. A plurality of arcuate portions are formed along a rim of the pressing portion 14a in a manner that each arcuate portion 15 communicates with the slit 13a. The pressing portion 14a is connected with each of the L-shaped retainers 12a by means of a bridge 16a. A wedge 17a is formed on an external surface of each L-shaped retainer 12a for clamping a disk 20.

With reference to FIG. 3, a recess 19a is defined in a bottom of the base 10a to oppositely correspond to the pressing portion 14a to provide a space for removing the disk from the wedge 17a.

With reference to FIG. 4, when the pressing portion 14a is pressed toward the recess 19a, the deformation of the pressing portion 14a forces all the L-shaped retainers 12a to tilt toward the pressing portion 14a and, therefore, to deform the circle formed by the arcuate walls 18a and the L-shaped retainers 12a. Thereby, the disk 20 is released from the wedge 17a.

With the above conventional structure, when the disk is to be removed from the disk holder, a user has to press down the pressing portion to release the clamping force applied on the disk. If the pressing portion is not continuously pressed, the clamping force a the retainers immediately recovers. If the disk is not manually removed while the pressing portion is being pressed down, the disk is still retained in the holder. Therefore, the user has to use both hands at the same time to remove the disk from the holder. In addition to the above downside, the application of the retaining device is further limited to a thin disk holder. In this case, the pressing portion is not easily pressed down.

SUMMARY OF THE INVENTION

It is therefore a principal object of the invention to provide a retaining structure used in a disk holder, in which external edges of retainer of the retaining structure can keep a disk above the retainer after a central opening of the disk is released from the retaining structure. Therefore, the user only needs one hand to place or remove the disk by pressing down the pressing face.

In order to achieve the above and other objectives of the invention; a retaining structure formed on a base of a disk holder is provided. A retaining structure formed on a base of a disk holder, which comprises a holding portion formed on the base; a retainer including: a plurality of elastic pieces equally spaced on the holding portion, the elastic pieces each having a peripheral end being a free end; a pressing face positioned on a central portion thereof, and the pressing face connected to each of the elastic pieces through a connection part; a trench formed along an peripheral side of the pressing face; a plurality of wedges each formed on an external surface of each of the elastic pieces; and a plurality of arcuate walls each formed between two adjacent elastic pieces and separated from each of the elastic pieces by a slit communicated with the trench; and a recess Formed on the base of the disk holder and opposite to the retainer.

To provide a further understanding of the invention, the following detailed description illustrates embodiments and examples of the invention, this detailed description being provided only for illustration of the invention.

BRIEF DESCRIPTION OF THE DRAWINGS

The drawings included herein provide a further understanding of the invention. A brief introduction of the drawings is as follows.

DETAILED DESCRIPTION OF THE EMBODIMENTS

Figure 1:
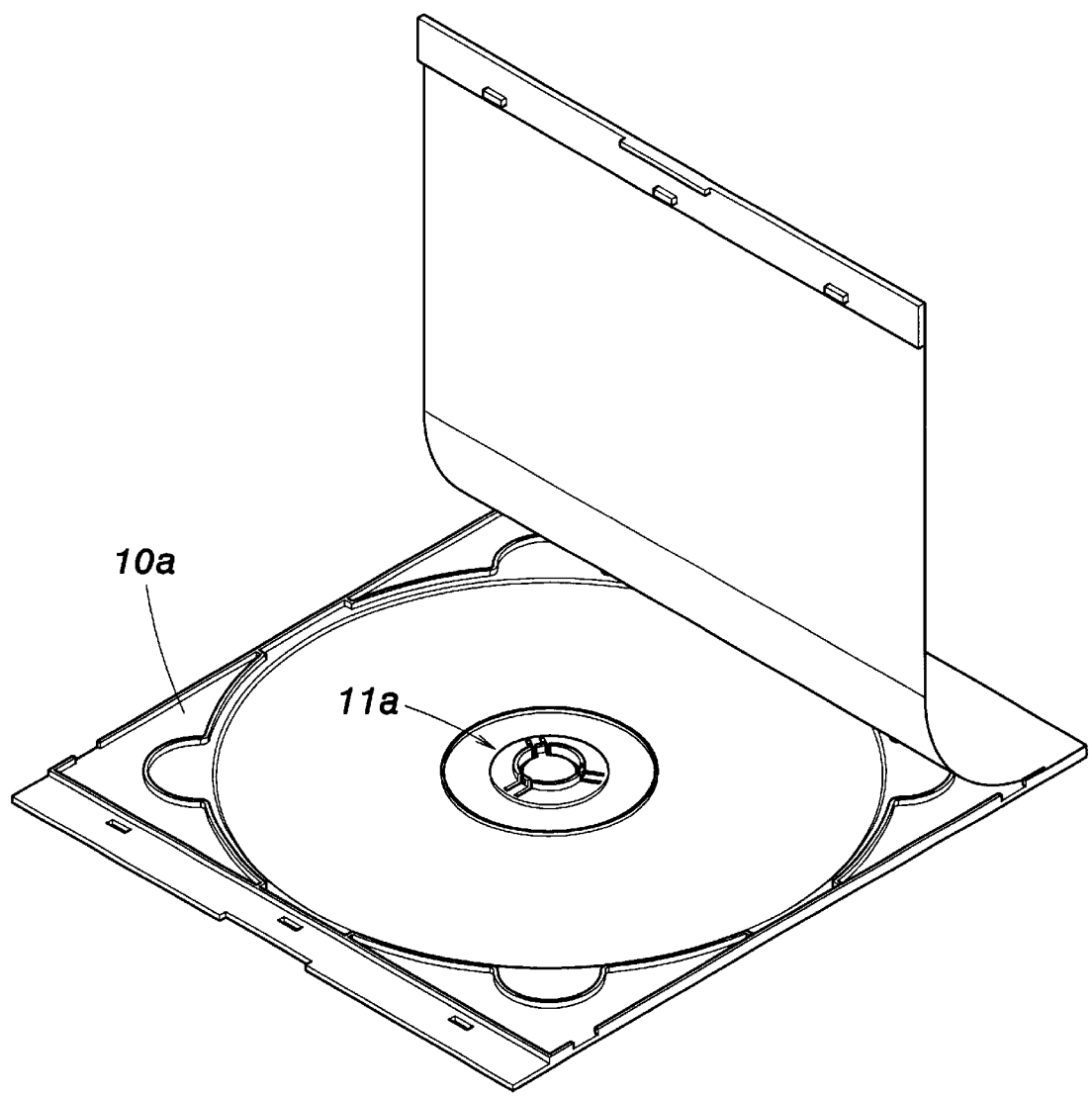
FIG. 1 is a perspective view of a conventional disk holder.
Figure 2:
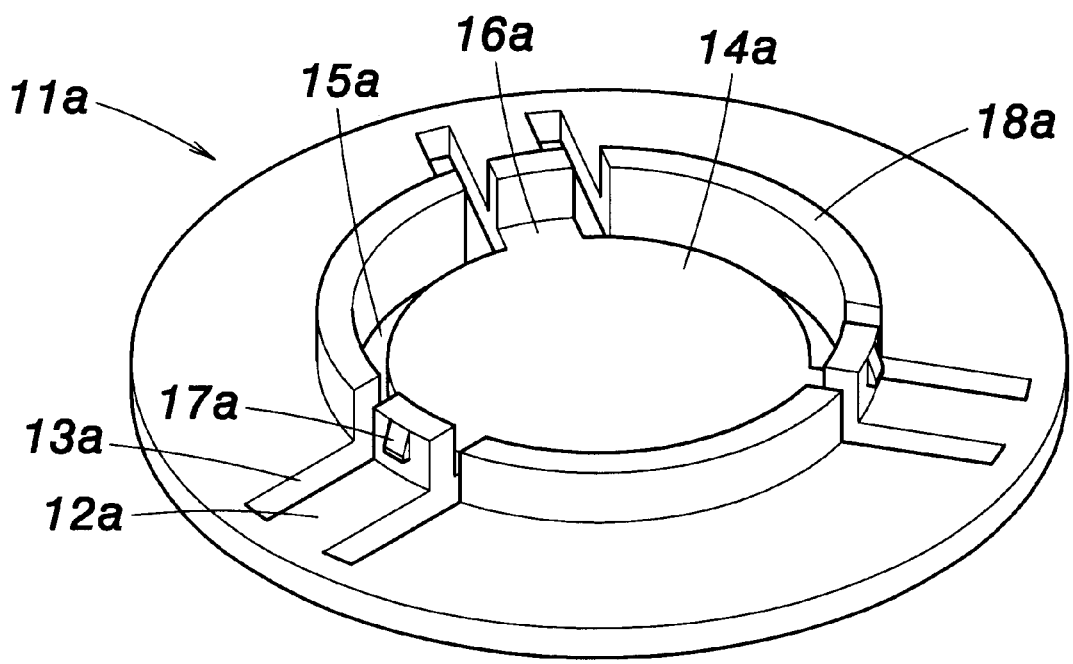
FIG. 2 is an enlarged view of a retaining device of a conventional disk holder.
Figure 3:
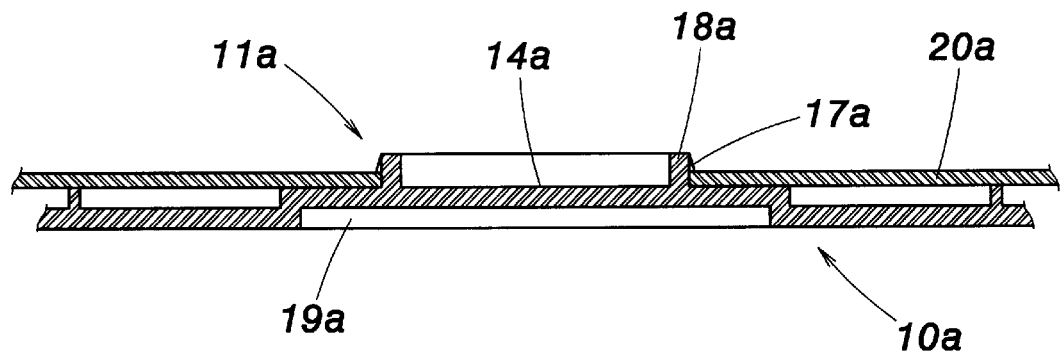
FIG. 3 is a cross-sectional view of a retaining device of a conventional disk holder clamping a disk.
Figure 4:
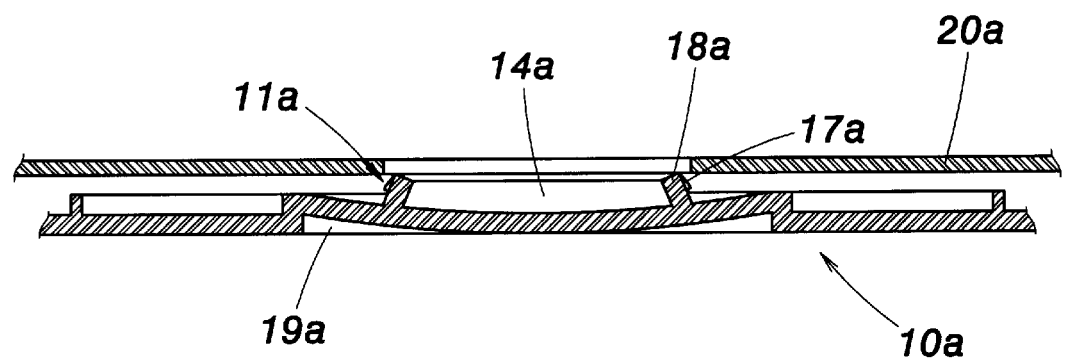
FIG. 4 is a cross-sectional view of a state that a pressing portion of a conventional disk holder is pressed down.

Wherever possible in the following description, like reference numerals will refer to like elements and parts unless otherwise illustrated.

Figure 5:
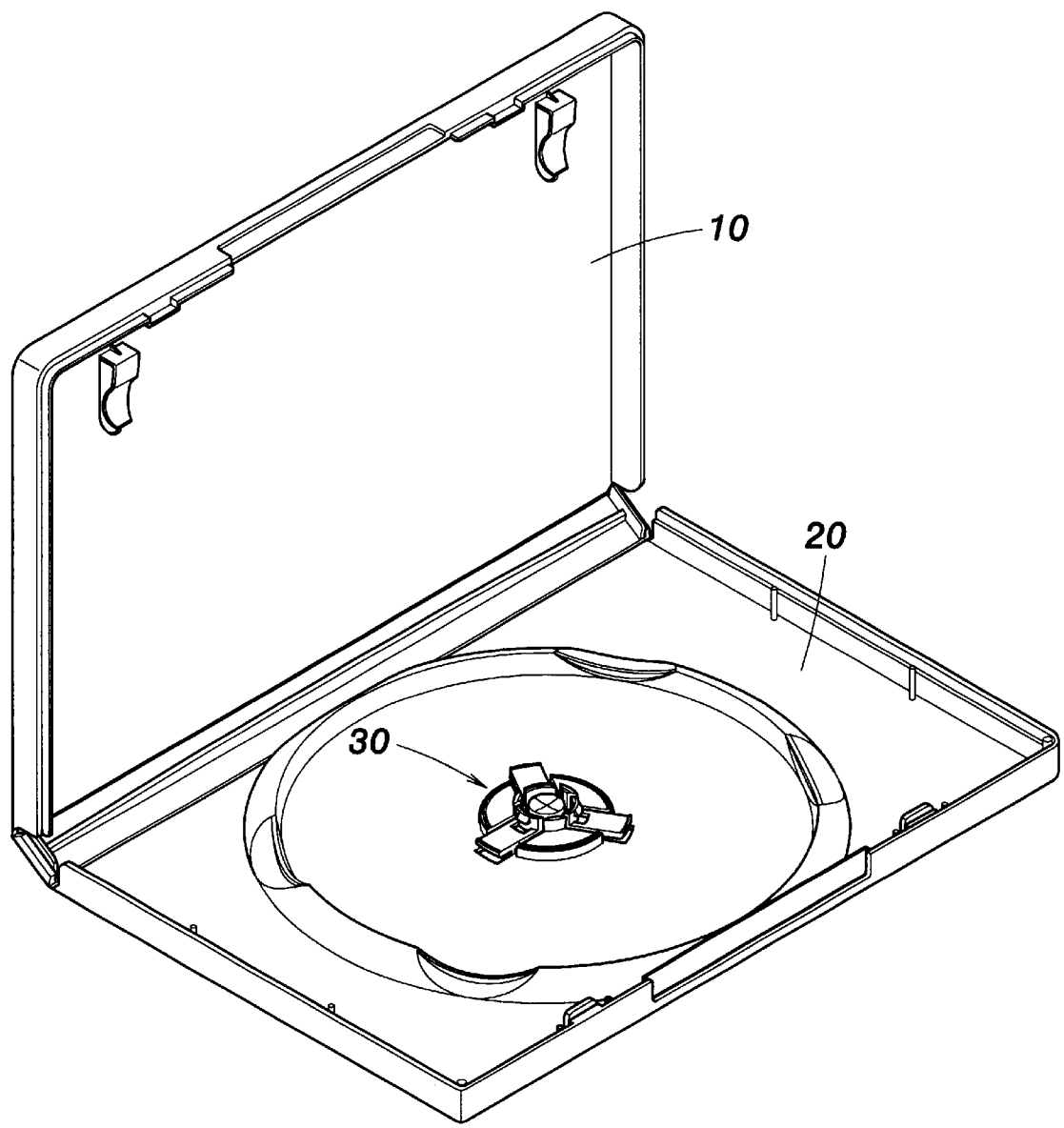
FIG. 5 is a perspective view of a disk holder according to one embodiment of the invention.
Figure 6:
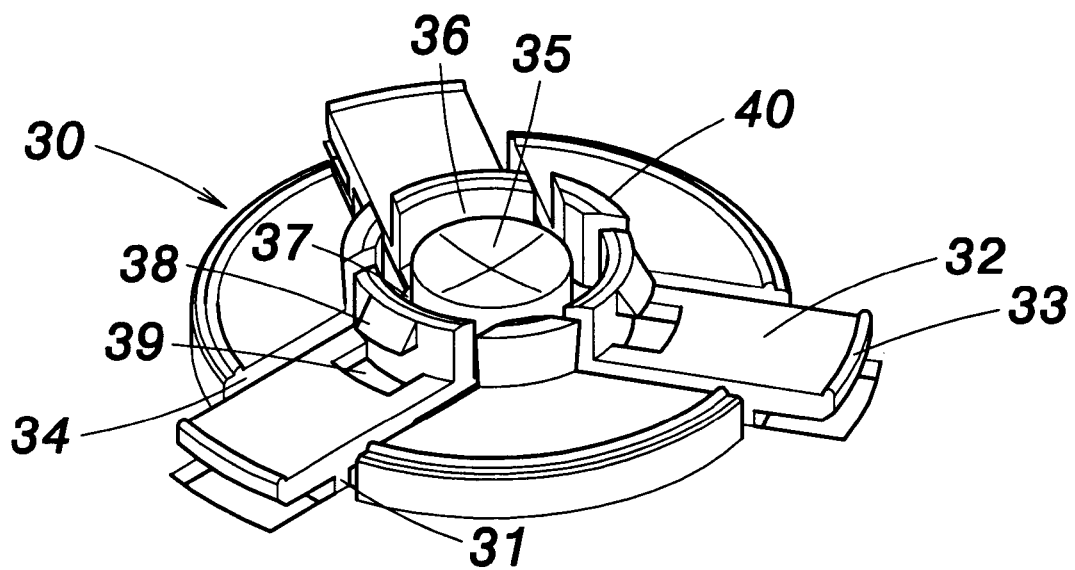
FIG. 6 is an enlarged view of a retaining structure formed on a base of a disk holder according to one embodiment of the invention.
Figure 7:
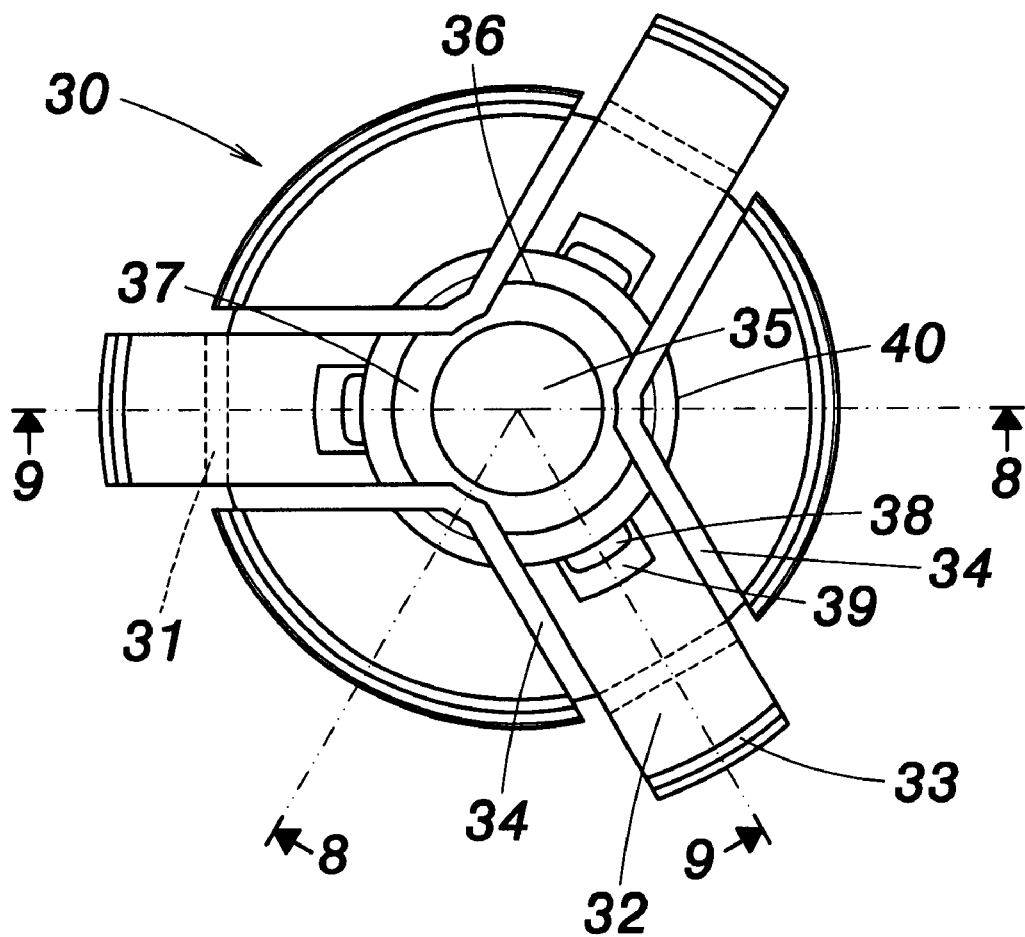
FIG. 7 is a top view of a retaining structure formed on la base of a disk holder according to one embodiment of the invention.
Figure 8:
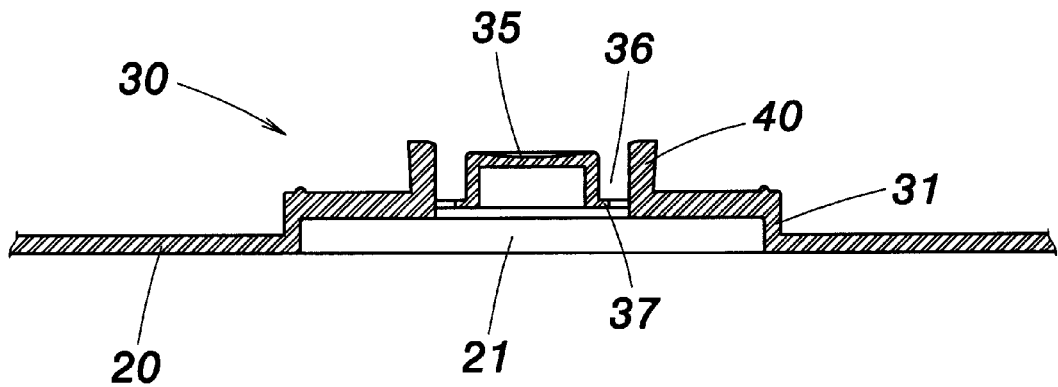
FIG. 8 is a cross-sectional view taken along line 8—8 of FIG. 7.
Figure 9:
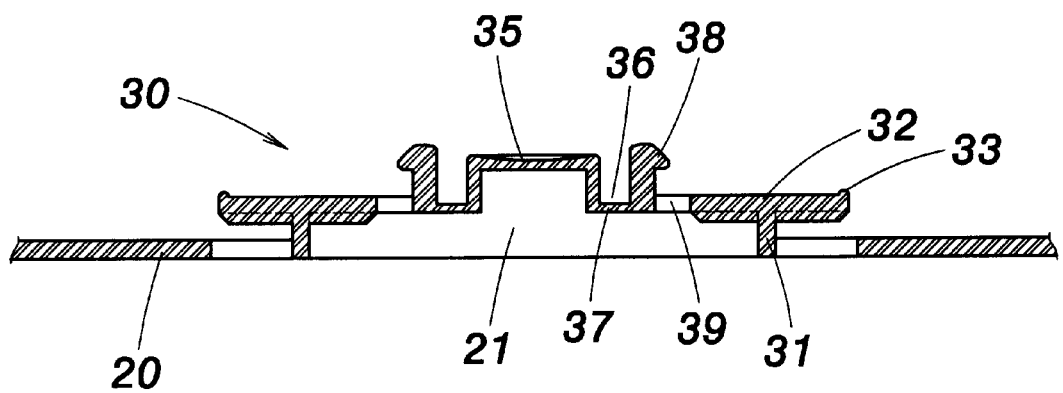
FIG. 9 is a cross-sectional view taken along line 9—9 of FIG. 7.

With reference to FIG. 5, a disk holder includes a cover 10 and a base 20 pivotally connected to the cover 10. A retainer 30 in the disk holder is formed at a center of the base 20 for holding and securely clamping a disk. A holding portion 31 is further formed on the base 20 and beneath a bottom of the retainer 30to increase the distance between the retainer 30 and the base 20, as shown in FIG. 6 and FIG. 8.

The retainer 30 includes a plurality of equally spaced L-shaped elastic pieces 32 that a formed in a circle on the holding portion 31, as shown in FIG. 6 to FIG. 9. Specifically, a central bottom of each elastic piece 32 is attached on the holding portion 31. Thereby, the elastic pieces 32 are located at a proper level from the base 20. A flange 33 is formed near an external edge of each elastic piece 32. A plurality of arcuate walls 40. Are respectively formed between adjacent elastic pieces 32, and are respectively separated from the elastic pieces 32 by slits 34. The arcuate walls 40 and the elastic pieces 32 are arranged according to a circular contour. A trench 36 is formed along an inner side of this circular contour to define a pressing face 35, the trench 6 communicating with at least one slit 34. As shown in FIG. 8 through FIG. 11, the pressing face 35 is located at a higher level than the elastic pieces 32. A bottom of the pressing face 35 is connected with each of the L-shaped elastic pieces 32 by means of a connection part 37 that is formed under the trench 36. A wedge 38 is formed on an external surface of each L-shaped elastic piece 32. A pair of through holes 39 are formed through each elastic piece 32 at a location sunder the wedge 38.

A recess 21 is formed on a side of the base 20 opposite to the elastic piece 30 for providing the user with a space to easily press down the pressing face 35 to release the disk from the wedge 38.

Figure 10:
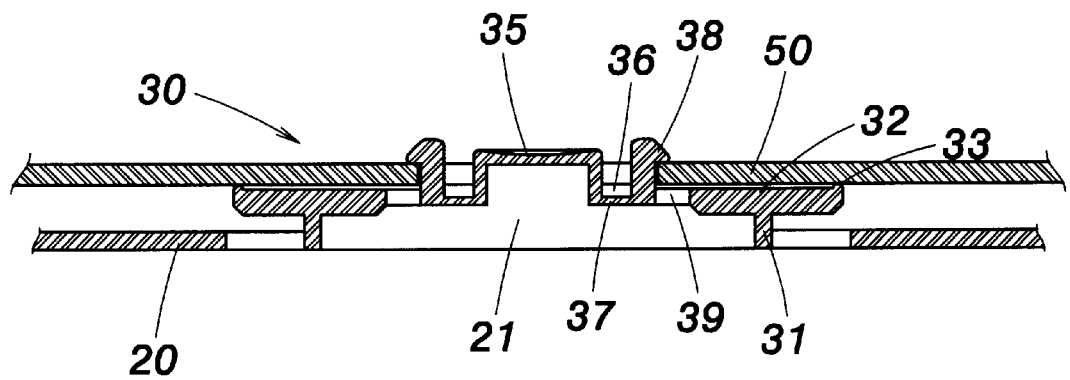
FIG. 10 is a cross-sectional view of a retaining device of a disk holder clamping a disk according to one embodiment of the invention.

With reference to FIG. 10, when the disk 50 is pressed on the elastic pieces 32 arranged in a circle, the central opening of the disk 50 slides along the external edges of the elastic pieces 32 until the disk 50 is firmly clamped by the wedges 38.

Figure 11:
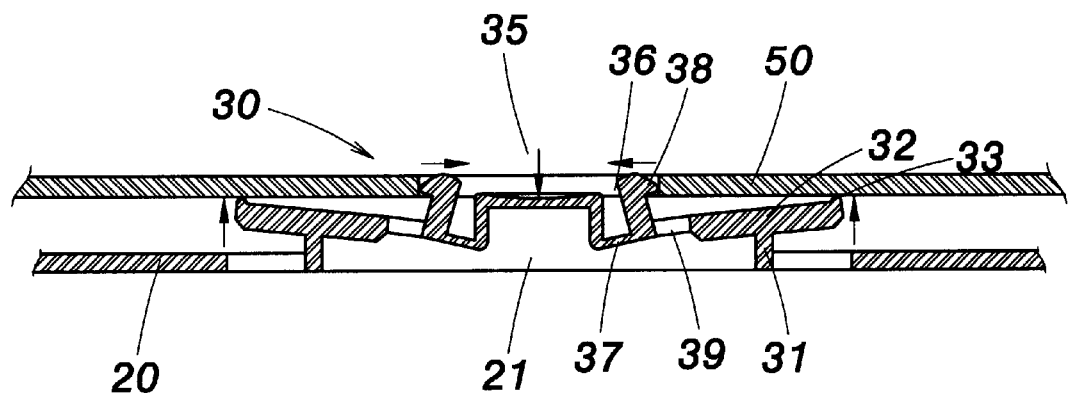
FIG. 11 is a cross-sectional view showing a pressing face of a retaining structure form d on a base of a disk holder is pressed down according to one embodiment of the invention.

With reference to FIG. 11, the pressing face 35 is pressed toward the recess 21, and the deformation of the pressing face 35 forces all of the elastic pieces 32 to tilt toward the pressing face 35. The circle formed by the arcuate walls 40 and the elastic pieces 32 is also deformed due to the deformation of the pressing face 35. At this time, the central opening of the disk 50 is larger than the deformed circle, and therefore is easily eased from the retainer 30.

When the pressing face 35 is pressed toward the recess 21, the pressing face 35 move downward together with inner ends of the elastic pieces 32. External ends of the elastic pieces 32 move upward by using the holding portion 31 as a pivot. The flange 33 near the external edges of the elastic pieces 32 abut against a bottom of the disk 50. The external edges of the elastic pieces 32 can keep the disk above the elastic piece after the central opening of the disk 50 is released from the wedges 38. Therefore, the user only needs one hand to place or remove the disk 50 by pressing down the pressing face 35.

Furthermore, the retaining structure of the invention is suitable for various types of disk holders. Since the pressing face 35 is located at a higher level than the elastic pieces 32, it is easier for the user to press down the pressing face 35 than the pressing portion 14a of the conventional retaining device.

It should be apparent to those skilled in, the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A retaining structure adapted to a disk holder having a base and a cover pivotally connected to each other, comprising:

a holding portion having a vertical height and disposed on the base; and a retainer including:

a plurality of elastic pieces equally spaced on the holding portion, and the elastic pieces each having a free end at a peripheral end thereof, wherein the holding portion as a fulcrum is positioned at a middle portion of each of the elastic pieces;

a pressing face positioned on a central portion thereof, and the pressing face connected to each of the elastic pieces through a connection part;

a trench formed around a peripheral side of the pressing face;

a plurality of wedges each formed on an external surface of each of the elastic pieces;

a plurality of inactive arcuate walls each formed between two adjacent elastic pieces and separated from each of the elastic pieces by a slit communicated with the trench, wherein each inactive arcuate wall has a vertical height slightly higher than or substantially equal to that of the pressing face for preventing the pressing face from being pressed from an outside of the cover; and a recess formed on the base of the disk holder and opposite to the retainer;

wherein the elastic pieces each have a through hole positioned under and according to the wedge.

2. The retaining structure of claim 1, wherein the elastic pieces each have a flange formed on a top thereof and near to an external edge thereof.

* * * * *